3,177,185
SYM-HEXAFLUOROISOPROPYL ACRYLATE COMPOUNDS AND POLYMERS THEREOF

Jerome Hollander and Cyril Woolf, Morristown, N.J., assignors to Allied Chemical Corporation, New York, N.Y., a corporation of New York
No Drawing. Filed Oct. 28, 1963, Ser. No. 319,546
15 Claims. (Cl. 260—89.5)

This invention relates to new fluorinated acrylic compounds, and more particularly, to new hexafluoroisopropyl acrylate and hexafluoroisopropyl methacrylate, their polymers and processes for their preparation.

Polymers prepared from the monoesters of acrylic acid have been long recognized as thermoplastic materials whose utility is both wide and varied. For example, acrylic polymers have been successfully employed as aircraft components, internally illuminated commercial signs, vending machine parts, windows, dials, safety shields, motor-boat deck hatches, shoe heels, piano and organ keys, industrial housings, etc.

Acrylates prepared by reaction of acrylic acid or derivative thereof with alcohols have enjoyed only limited utility since they exhibit an inherent degree of instability when exposed to critical thermal conditions.

Bittles, in U.S.P. 2,628,958, attempted to obtain fluorinated acrylic monomers and their thermally stable polymers by reacting acrylic acid with a primary fluorinated alcohol followed by polymerization but found that acceptable thermal stability was only attained when the straight chain fluorinated alcohol moiety contained at least five carbon atoms. Thus, Bittles required a fluorinated primary alcohol of at least five carbon atoms in order to obtain a useful product.

It has been found, and surprisingly so, that hexafluoroisopropyl alcohol, although a secondary alcohol and comprised of less than five carbon atoms when reacted by acrylic acid or methacrylic acid or derivatives thereof produces an intermediate fluorinated acrylic monomer which when converted to its corresponding polymer, possesses outstanding thermal and dimensional stability. Moreover, these fluorinated acrylic polymers derived from hexafluoroisopropyl alcohol when utilized as fiber impregnators exhibit outstanding and unexpected oleophobic and hydrophobic properties as described in our co-pending U.S. application Serial No. 319,514, filed of even date.

Our co-filed U.S. application Serial No. 319,590 discloses and claims sym-tetrafluorodichloroisopropyl acrylate and methacrylate compounds, homopolymers derived therefrom and processes for their preparation.

Accordingly, it is a principal object of the present invention to provide new hexafluoroisopropyl acrylate and hexafluoroisopropyl methacrylate. It is a further object of the present invention to provide new fluorinated acrylic polymers derived from hexafluoroisopropyl acrylate and hexafluoroisopropyl methacrylate. It is still a further object to provide processes for preparing hexafluoroisopropyl acrylate and hexafluoroisopropyl methacrylate and their corresponding acrylic polymers. Other objects and advantages will become apparent from the following description.

The new fluorinated acrylic polymers may be prepared by the polymerizing a monomer of the general formula

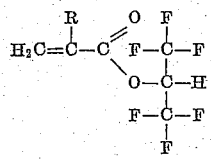

wherein R is a member selected from the group consisting of hydrogen and methyl. The fluorinated acrylic monomers may be prepared by reacting hexafluoroisopropyl alcohol with an acrylic compound. It is to be understood, of course, that the term "acrylic compound" refers to both acrylic and methacrylic derivatives.

One of the reactants used in the preparation of the monomers is hexafluoroisopropyl alcohol which is a colorless liquid having a boiling point of 58° C. U.S. application of Hollander et al. Serial No. 207,382, filed July 3, 1962, describes the preparation of hexafluoroisopropyl alcohol from hexafluoroacetone by hydrogenation.

The fluorinated acrylic monomers of the present invention may be prepared by reacting hexafluoroisopropyl alcohol with an acrylic compound of the formula

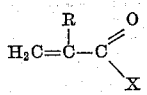

wherein X is a member selected from the group consisting of chlorine, hydroxyl and methoxy and R is a member selected from the group consisting of hydrogen and methyl. It is to be understood of course that the acrylic reactant may also be employed in the form of its anhydride. The general formula for such acrylic anhydride reactants is

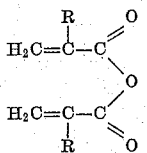

wherein R is hydrogen or methyl. In one preferred form of the operation, acrylyl chloride or methacrylyl chloride is employed. The molar ratio of the reactants is not critical and from about 0.1 mol to about 10 mols hexafluoroisopropyl alcohol per mol acrylic reactant may be employed to secure the desired reaction product. It is preferred, however, in order to secure highest yields, that a substantially stoichiometric molar ratio of about 1:1 be employed. A suitable solvent, if desired, may be employed to serve as a diluent and to facilitate the reaction at elevated temperatures. Generally speaking, any solvent may be employed provided it is inert under the conditions of reaction and a solvent for the reactants. Illustrative of such solvents are: pyridine, quinoline, dimethyl aniline, trifluoroacetic acid, Decalin and 1,1,2-trifluoro-1,2,2-trichloroethane.

In order to minimize reaction time a suitable esterification catalyst such as pyridine, quinoline, trifluoroacetic acid, p-toluene sulfonic acid, phosphonic acid and sulfuric acid may be employed. The amount of catalyst is not critical and may range from about 1.0 to 200% by weight based on the amount of hexafluoroisopropyl alcohol charged. In preferred operation, however, pyridine is employed since it acts as both a solvent and a catalyst when acrylyl or methacrylyl chloride is used. Generally, the amount of pyridine charged to the reaction mixture is about 0.10 to 2.00 parts, preferably 0.5 to 1.5 parts, per part hexafluoroisopropyl alcohol charged. The reaction temperature may vary over a wide range, i.e. from about room temperature up to the boiling point of the reaction mixture. In preferred operation, a temperature selected from about room temperature to 100° C. is utilized with a mild agitation of the reaction mixture.

Although acrylyl or methacrylyl chloride is used in preferred operation, the acid or anhydride form of the arylic reactant may be successfully employed to effect esterification in the presence of a dehydrating and esterification catalyst such as trifluoroacetic acid, sulfuric acid and p-toluene sulfonic acid under the same reaction conditions recited herein. Recovery and purification of the resulting hexafluoroisipropyl acrylate or hexafluoroisopropyl methacrylate may be effected by employing conventional procedures. For example, the entire reaction mixture may be added to a non-solvent such as water then extracted with a solvent such as ether followed by evaporating off of the solvent. Also, distillation of excess reactants and solvent may be employed. Purification procedure may comprise treating with acid and washing with water followed by oven-drying.

Polymerization of these fluorinated acrylic monomers may be effected by simply maintaining the monomer at a temperature in the range of 0° C. to 125° C., by the addition of a polymerization catalyst, by actinic radiation or combination thereof. The siutable polymerization catalysts are illustrated by organic free radical generators such as benzoyl peroxide, lauryl peroxide, acetyl peroxide, succinyl peroxide, azobutylonitrile or potassium persulfate. Polymerization by actinic radiation normally comprises placing the liquid hexafluoroisopropyl acrylate or hexafluoroisopropyl methacrylate in an evacuated, sealed tube and then exposing it to ultra-violet light at a temperature of from about room temperature to about 125° C. The reaction time for polymerization varies over a wide range and, for the most part, is dependent on both the temperature employed and the intensity of the radiation. Normally polymerization is accomplished in about 10 to 72 hours.

The following examples are given for the purpose of illustration and not limitation. In the examples parts are by weight.

Example 1

To a cooled vessel containing 18.5 parts of hexafluoroisopropyl alcohol was added, in dropwise fashion, 10.5 parts of methacrylyl chloride. The resulting reaction mixture was slightly agitated at room temperature for 0.5 hour followed by refluxing for a period of 12 hours. 50 parts of pyridine, as catalyst and solvent, were added to the reaction mixture followed by heating for a period of five hours at a temperature range of 70° to 100° C. The resulting reaction mixture containing hexafluoroisopropyl methacrylate, excess reactants, and pyridine was then poured into 200 parts of water cooled to a temperature of about 5° C. followed by extraction with ether. The ether extracts were washed with a dilute aqueous solution of hydrochloric acid then water washed. A dilute aqueous sodium carbonate solution was added to neutralize any trace of hydrochloric acid followed by additional water washings. Removal of water from the ether solution containing hexafluoroisopropyl methacrylate was effected by the addition of sodium sulfate anhydride followed by removal of the ether by distillation. The resulting crude hexafluoroisopropyl methacrylate was a brown liquid to which was added p-tertiarybutyl catechol, as polymerization inhibitor, followed by redistillation. 6.5 parts of hexafluoroisopropyl methacrylate as a clear, colorless liquid having a boiling point of 26 to 28° C./53 mm. were obtained. Elemental analysis showed 48.1% fluorine and 2.55% hydrogen which is in excellent agreement with the theoretical valves of 48.2% fluorine and 2.48% hydrogen.

Example 2

6.5 parts of hexafluoroisopropyl methacrylate prepared by Example 1 and 0.07 part of benzoyl peroxide were placed in a combustion tube, degassed 4 times and then sealed. The sealed tube containing this reaction mixture was kept at a constant temperature of 50° C. for a period of six days. At the end of this period, the hard, water-white polymer of hexafluoroisopropyl methacrylate was removed and purified by first dissolving the polymer in acetone followed by precipitation of the polymer by adding methanol to the acetone solution. Filtration from methanol yielded 2.4 parts of hexafluoroisopropyl methacrylate polymer as a white powder having a softening point of 210° C.

Example 3

To a cooled vessel provided with a thermometer and stirrer was added 231 parts of trifluoroacetic anhydride, 76 parts of acrylic acid and 0.5 part of hydroquinone as stabilizer and admixed at a temperature of 0° C. The temperature increased to 10° C. and the intermediate acrylic anhydride was formed. 168 parts of hexafluoroisopropanol were then added at 10° C. under constant agitation and the reaction temperature allowed to rise to 25° C. and maintained at a temperature range of about 25° to 30° C. for 1½ hours and then at a temperature of 40° C. for an additional period of 2 hours. The crude hexafluoroisopropyl acrylate was cooled to 0° whereupon 250 parts of water were gradually added over a period of 20 minutes while maintaining the temperature of the reaction mixture at 10° C. by external cooling. The reaction mixture was allowed to stand and the crude hexafluoroisopropyl acrylate was separated and water washed 5 times. 0.3 part of hydroquinone, as stabilizer, was added and the hexafluoroisopropyl acrylate was dried over anhydrous sodium sulfate. 96 parts of hexafluoroisopropyl acrylate, having a boiling point of 40 to 40.5° C. at 140 millimeters mercury were isolated by vacuum distillation. Infrared absorption spectrum showed a carbonyl group at 5.7 microns, carbon-hydrogen bond at 3.3 microns and a carbon-carbon double bond at 6.1 microns. Elemental fluorine anaylsis showed 52% by weight fluorine which is in excellent agreement with the theoretical value of 51.2%.

Example 4

15 parts of hexafluoroisopropyl acrylate as prepared by Example 3 were added to 27.6 parts of an aqueous solution containing 1.65 of sodium lauryl sulfate and 0.5 part of potassium persulfate at 20° C. The reaction vessel was continuously flushed with nitrogen and then heated for a period of 4 hours at a temperature which was progressively increased from 20° C. to 46° C. under constant agitation. An additional 0.5 part of potassium persulfate was added and the reaction mixture heated at a temperature of 55° C. for an additional hour. The crude poly hexafluoroisopropyl acrylate was added to 180 parts of methanol whereupon the hexafluoroisopropyl acrylate polymer precipitated out of solution as a white solid which is isolated by filtration.

This invention may be embodied in other forms or carried out in other ways without departing from the spirit or essential characteristics thereof. The present embodiment is, therefore, to be considered in all respects as illustrative and not restrictive, the scope of the invention being indicated by the appended claims.

We claim:

1. Fluorinated acrylic compounds having the formula:

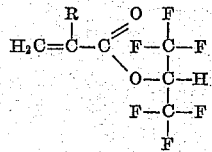

wherein R is a member selected from the group consisting of hydrogen and methyl.

2. Sym-hexafluoroisopropyl acrylate.

3. Sym-hexafluoroisopropyl methacrylate.

4. A fluorinated acrylic homopolymer derived from a monomer having a formula:

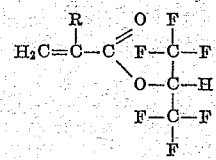

wherein R is a member selected from the group consisting of hydrogen and methyl.

5. A homopolymer in accordance with claim 4 wherein the monomer is sym-hexafluoroisopropyl acrylate.

6. A homopolymer in accordance with claim 4 wherein the monomer is sym-hexafluoroisopropyl methacrylate.

7. A process for the preparation of a fluorinated acrylic compound having the formula:

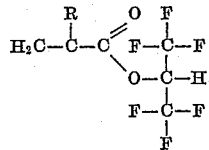

wherein R is selected from the group consisting of methyl and hydrogen which comprises admixing sym-hexafluoroisopropyl alcohol with an acrylic compound of the formula:

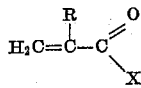

wherein X is a member selected from the group consisting of chlorine, hydroxyl and methoxy and R is a member selected from the group consisting of hydrogen and methyl in a molar ratio of from about 0.1 to 10 mols sym-hexafluoroisopropyl alcohol per mol acrylic compound at a temperature from about room temperature to the boiling point of the reaction mixture and recovering the resulting fluorinated acrylic compound.

8. A process in accordance with claim 7 wherein the acrylic compound is employed in the form of its anhydride.

9. A process in accordance with claim 7 wherein said reaction is carried out in the presence of an inert solvent.

10. A process in accordance with claim 7 wherein said reaction is carried out in the presence of an esterification catalyst.

11. A process in accordance with claim 7 wherein said reaction is carried out in the presence of pyridine.

12. A process for the preparation of fluorinated acrylic polymers which comprises homopolymerizing by heating a monomer of the formula:

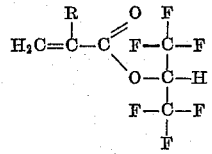

wherein R is a member selected from the group consisting of hydrogen and methyl.

13. A process in accordance with claim 11 wherein a polymerization catalyst is employed.

14. A process in accordance with claim 12 wherein the polymerization catalyst is an organic peroxide.

15. A process in accordance with claim 11 wherein polymerization is carried out by actinic radiation.

No references cited.

JOSEPH L. SCHOFER, *Primary Examiner.*

DONALD E. CZAJA, *Examiner.*